(12) United States Patent
Park

(10) Patent No.: US 7,157,814 B2
(45) Date of Patent: Jan. 2, 2007

(54) STATOR FOR RECIPROCATING MOTOR AND MANUFACTURING METHOD THEREOF

(75) Inventor: Kyeong-Bae Park, Seoul (KR)

(73) Assignee: LG Electronics Inc., Seoul (KR)

( * ) Notice: Subject to any disclaimer, the term of this patent is extended or adjusted under 35 U.S.C. 154(b) by 195 days.

(21) Appl. No.: 10/267,842

(22) Filed: Oct. 10, 2002

(65) Prior Publication Data

US 2003/0102763 A1    Jun. 5, 2003

(51) Int. Cl.
*H02K 33/00* (2006.01)
*H02K 1/12* (2006.01)
*H02K 15/02* (2006.01)
*F04B 17/03* (2006.01)

(52) U.S. Cl. .................... 310/15; 310/42; 310/216; 310/217; 29/596; 417/416

(58) Field of Classification Search ............... 310/254, 310/216, 217, 259, 258, 13, 15, 23, 24, 27, 310/30, 34, 42, 12, 218
See application file for complete search history.

(56) References Cited

U.S. PATENT DOCUMENTS

| | | | | |
|---|---|---|---|---|
| 1,728,895 | A * | 9/1929 | Haughton | 29/596 |
| 3,043,971 | A * | 7/1962 | Stevens | 310/216 |
| 3,502,914 | A * | 3/1970 | Cox | 310/42 |
| 4,102,040 | A * | 7/1978 | Rich | 29/598 |
| 5,300,845 | A * | 4/1994 | Fanning et al. | 310/217 |
| 5,525,852 | A * | 6/1996 | Fanning et al. | 310/217 |
| 5,592,731 | A * | 1/1997 | Huang et al. | 29/596 |
| 5,844,332 | A | 12/1998 | Lee | |
| 5,945,748 | A * | 8/1999 | Park et al. | 310/12 |
| 6,064,134 | A * | 5/2000 | El-Antably et al. | 310/261 |
| 6,265,804 | B1 * | 7/2001 | Nitta et al. | 310/259 |
| 6,337,529 | B1 * | 1/2002 | Higashino et al. | 310/254 |
| 6,700,286 | B1 * | 3/2004 | Park | 310/217 |
| 6,741,008 | B1 * | 5/2004 | Jeon et al. | 310/254 |
| 6,770,990 | B1 * | 8/2004 | Hong | 310/15 |
| 6,787,942 | B1 * | 9/2004 | Lilie et al. | 310/12 |
| 2003/0102763 | A1 * | 6/2003 | Park | 310/216 |

FOREIGN PATENT DOCUMENTS

| | | |
|---|---|---|
| JP | 7-135754 A | 5/1995 |
| JP | 10-323009 A | 12/1998 |
| JP | 2000-228855 A | 8/2000 |
| WO | WO 01/61830 A1 | 8/2001 |
| WO | WO 01/61831 A1 | 8/2001 |
| WO | WO-01/73923 * | 10/2001 |
| WO | WO 01/73923 A2 | 10/2001 |
| WO | WO01/73923 A3 * | 10/2005 |

* cited by examiner

*Primary Examiner*—Burton Mullins
(74) *Attorney, Agent, or Firm*—Birch, Stewart, Kolasch and Birch, LLP

(57) ABSTRACT

Disclosed are a stator for a reciprocating motor and a manufacturing method thereof which are able to simplify assembling processes, to reduce assembling time, and thereby to improve productivity by laminating an inner stator to be a straight line shape and bending to be a cylindrical shape. The stator is fabricated by laminating lamination sheets as a straight line and bending it to be a cylindrical shape, and a mounting band is fixed on inner circumferential surface of the lamination sheets so as to maintain the lamination sheets connected when the lamination sheets are bent to be the cylindrical shape.

10 Claims, 8 Drawing Sheets

STATOR FOR RECIPROCATING MOTOR AND MANUFACTURING METHOD THEREOF

BACKGROUND OF THE INVENTION

1. Field of the Invention

The present invention relates to a stator for a reciprocating motor and a manufacturing method thereof, and particularly, to a stator for a reciprocating motor and a manufacturing method thereof by which an assembling process can be made in a simple way and assembling time can be reduced.

2. Description of the Background Art

Generally, a reciprocating motor is a motor in which a magnet assembly is linearly reciprocated according to changes of flux formed on a stator. In addition, the reciprocating motor is mainly used in a reciprocating compressor, and a piston of the reciprocating compressor and the magnet assembly are connected to make the piston linearly reciprocate.

FIG. 1 is a cross-sectional view showing a reciprocating motor according to the conventional art, and FIG. 2 is a side view showing the reciprocating motor according to the conventional art.

The conventional reciprocating motor comprises: an outer stator 102 supported by a supporting frame (not shown); an inner stator 104 disposed on an inner circumferential surface of the outer stator 102 with a predetermined air gap for forming a flux with the outer stator 102; a winding coil 106 wound on one of the outer stator 102 and the inner stator 104; a magnet 108 disposed between the outer stator 102 and the inner stator 104 so as to be moved linearly; and a magnet paddle 110 connected between the magnet 108 and an operational portion (not shown) which is desired to be linearly reciprocated for transmitting the reciprocating movements of the magnet 108 to the operational portion.

Herein, as shown in FIG. 2, the outer stator 102 is made by laminating a plurality of lamination sheets 112 in a radial direction to make a cylinder shape, and the winding coil 106 is wound on inner surface of the outer stator 102. In addition, supporting rings 118 are put on both surfaces so that the lamination sheets 112 can be maintained as a cylindrical shape.

As shown in FIG. 3, the inner stator 104 is formed as a cylinder by laminating a plurality of lamination sheets 116 in a radial direction, and the supporting rings 120 are put on the both surfaces so as to maintain the cylindrical shape of the lamination sheets 116. Herein, the lamination sheet 116 of the inner stator is a thin plane plate having a predetermined length and includes grooves 122, on which the supporting rings 120 are put, formed on both side surfaces.

The inner stator 104 is formed by laminating the lamination sheets 116 in a radial direction on an outer circumferential surface of a circular bar type mold to be a cylindrical shape, and after that, by putting the supporting rings 120 on the grooves 122 formed on both side surfaces to support the lamination sheets 116 in the cylindrical shape.

However, the inner stator of the conventional reciprocating motor is made to be the cylindrical shape by inserting a plurality of lamination sheets into the mold of the circular bar type one by one in the radial direction. Therefore, the assembling time is increased and assembling process becomes complex.

SUMMARY OF THE INVENTION

Therefore, an object of the present invention is to provide a stator for a reciprocating motor and a manufacturing method thereof which are able to simplify assembling processes and to reduce assembling time, and thereby to improve productivity by bending an inner stator to be a cylindrical shape after laminating in straight shape.

To achieve the object of the present invention, as embodied and broadly described herein, there is provided a stator for a reciprocating motor comprising: a plurality of lamination sheets laminated to be a cylindrical shape; supporting rings put on both side surfaces of the lamination sheets for supporting the lamination sheets to maintain the cylindrical shape; and a mounting band which is fixed on an inner circumferential surface of the lamination sheets for connecting the lamination sheets so that the lamination sheets can be connected when the lamination sheets laminated in straight shape are bent to be cylindrical shape.

The lamination sheet of the stator is a rectangular thin plane plate. In addition, grooves on which the supporting rings are put are formed on both shorter sides, and a mounting groove to which the mounting band is fixed is formed on one longer side.

The mounting band of the stator has a predetermined size to be inserted into the mounting groove, and is formed as a predetermined shape which can be changed from straight shape to curved shape.

The mounting band of the stator can be divided into a plurality of pieces having predetermined lengths, and is formed to have a structure in which the pieces are connected to each other.

The mounting band of the stator is fixed on the mounting groove on the lamination sheet by welding.

The mounting band of the stator is fixed on the mounting groove on the lamination sheet by caulking operation.

Also there is provided a method for manufacturing a stator for a reciprocating motor comprising: a first step of laminating a plurality of lamination sheets to be a straight line so that side surfaces of the lamination sheets can be contacted to each other; a second step of fixing a mounting band on a mounting groove which is formed on one side surface of the lamination sheet so as to connect the lamination sheets laminated as a straight line in above step; a third step of forming the lamination sheets which are laminated in straight line shape and connected to each other in the second step to be a cylindrical shape; and a fourth step of press-fitting supporting rings into both side surfaces of the lamination sheets laminated as a cylinder in above third step.

The lamination sheet in the first step is formed as a thin plane plate having grooves, to which the supporting rings are press-fitted, formed on both shorter sides, and having a mounting groove, on which the mounting band is fixed, on one longer side.

The mounting band in above second step is fixed on the mounting groove of the lamination sheet by welding or by caulking.

The lamination sheets in the above third step are formed by assemblies of sector shape.

The lamination sheets in the above third step are formed as a unit having the number making a cylinder body.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

There may be a plurality of embodiments of a reciprocating motor according to the present invention. The preferred embodiments will be described as follows.

Figure 1:
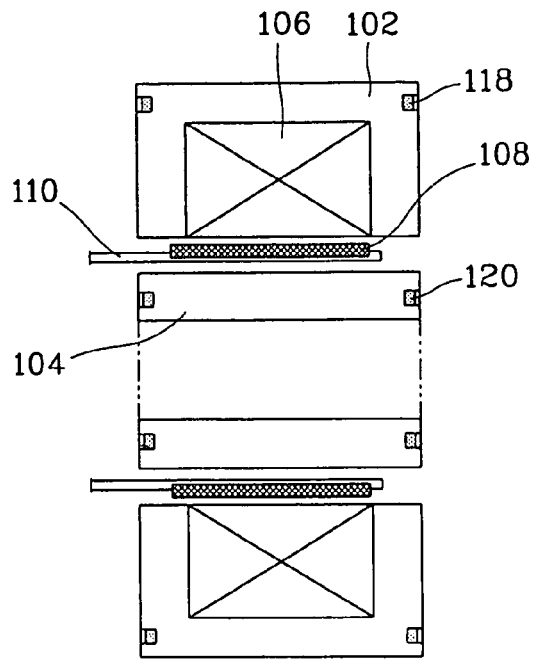
FIG. 1 is a cross-sectional view showing a reciprocating motor according to the conventional art.
Figure 2:
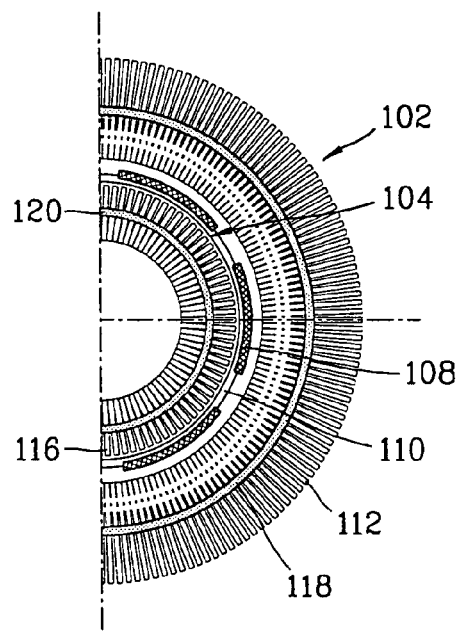
FIG. 2 is a side view showing the reciprocating motor according to the conventional art.
Figure 3:
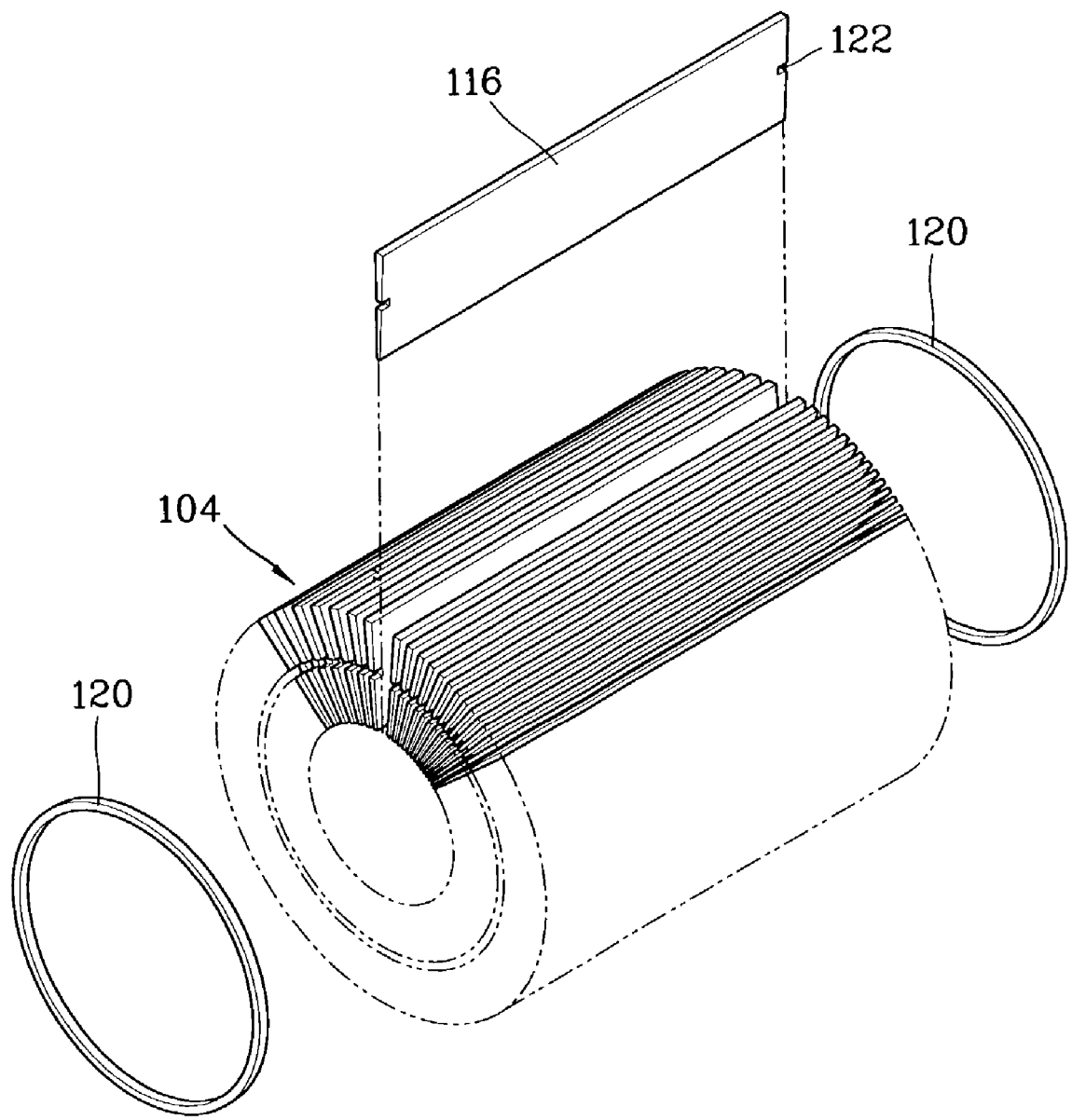
FIG. 3 is a perspective view showing an inner stator of the reciprocating motor according to the conventional art.
Figure 4:
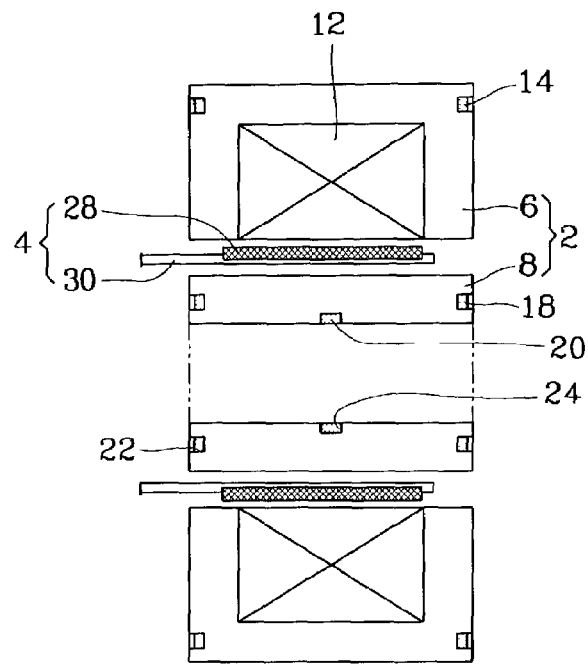
FIG. 4 is a cross-sectional view showing a reciprocating motor according to the present invention.

FIG. 4 is a cross-sectional view showing a reciprocating motor according to the present invention.

The reciprocating motor according to the present invention comprises: a stator assembly 2 supported by a frame (not shown) for forming a flux when an electric source is applied; and a magnet assembly 4 disposed with a predetermined air gap from the stator assembly 2 and reciprocated by an interaction with a flux generated from the stator assembly 2.

Figure 5:
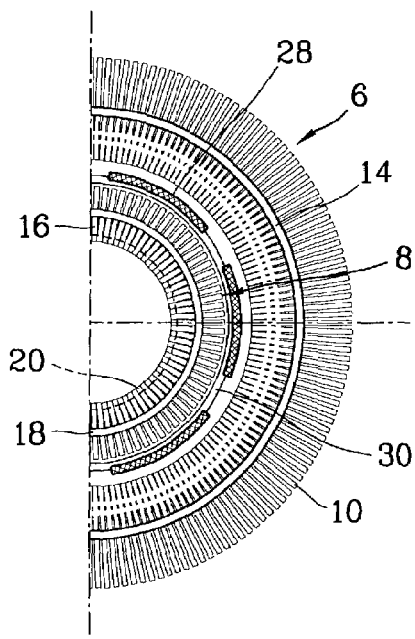
FIG. 5 is a side view showing the reciprocating motor according to the present invention.

As shown in FIG. 5, the stator assembly 2 comprises an outer stator 6 formed as a cylinder by laminating a plurality of lamination sheets 10; an inner stator 8 disposed on an inner circumferential surface of the outer stator 6 with a predetermined air gap therebetween for forming the flux with the outer stator 6; and a winding coil 12 wound on one of the outer stator 6 and the inner stator 8.

The outer stator 6 is made by laminating lamination sheets 10 having predetermined lengths in a radial direction to form a cylindrical shape. The winding coil 12 is wound on an inner circumference. The supporting rings 14 are put on both side surfaces for supporting the plurality of lamination sheets 10 to maintain the cylindrical shape.

The inner stator 8 is disposed with a predetermined air gap from the inner circumferential surface of the outer stator 6, and a plurality of lamination sheets 16 are laminated to make a cylindrical shape therein. In addition, supporting rings 18 are put on both side surfaces of the inner stator for supporting the plurality of lamination sheets 16 to maintain the cylindrical shape, and a mounting band 20 is mounted on an inner circumferential surface of the inner stator 8 for connecting the lamination sheets.

Herein, the lamination sheet 16 is formed as a thin rectangular plane plate having a predetermined length. In addition, grooves 22 to which the supporting rings 18 are press-fitted are formed on shorter sides of the lamination sheet 16 making both side surfaces of the inner stator 8, and a mounting groove 24 on which the mounting band 20 is fixed is formed on a center portion of a part which constructs the inner circumferential surface when the lamination sheets 16 are formed as a cylinder.

In addition, the mounting band 20 has a predetermined size which is inserted into the mounting groove 24, and is formed by a predetermined material and shape which can be changed from a straight shape to a curved shape. For example, the mounting band 20 is formed by connecting a plurality of pieces having predetermined lengths, and thereby, can be changed from the state spread as a straight line to a circular shape.

The magnet assembly 4 is disposed on an area between the outer stator 6 and the inner stator 8, and comprises: a magnet 28 linearly moved by an interaction with the flux generated between the outer stator 6 and the inner stator 8; and a magnet paddle 30, on which the magnet 28 is mounted, for transmitting the linear moving force of the magnet 28 to an operational unit (not shown) which is desired to be linearly moved.

FIGS. 6A, 6B, 6C, 6D, and 6E are perspective views showing a manufacturing process for the inner stator according to the present invention.

Figure 6A:
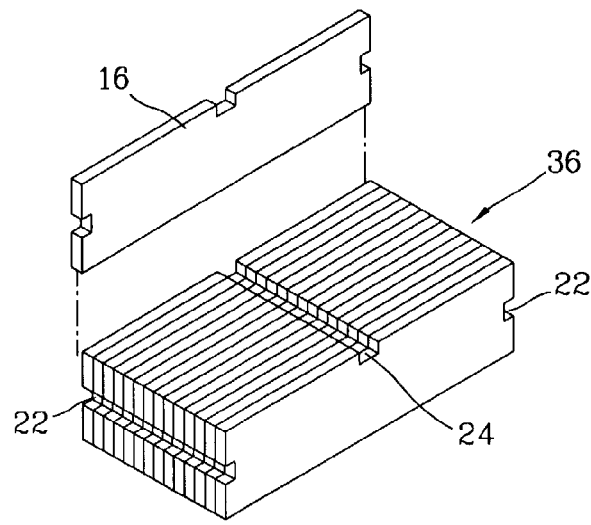
FIGS. 6A, 6B, 6C, 6D, and 6E are perspective views showing a manufacturing process for an inner stator for the reciprocating motor according to the present invention.

First, as shown in FIG. 6A, a plurality of lamination sheets 16 are laminated on a plane surface to be contacted in order.

The lamination sheet is formed as a thin rectangular plane plate. The grooves 22 are formed on the shorter sides. The mounting groove 24 is formed on one longer side. The mounting grooves 24 of the lamination sheets 16 are located to face the upper direction, and are arranged to be disposed on a straight line.

Herein, the lamination sheets 16 form the inner stator 8. For example, one-fourth of the lamination sheets are laminated as an assembly 36, and four assemblies 36 are assembled to make an inner stator 8 of a cylindrical shape.

Figure 6B:
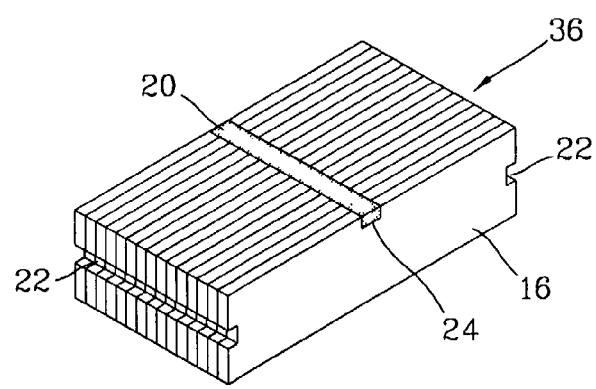

After that, as shown in FIG. 6B, the mounting band 20 is joined with the mounting groove 24 of the lamination sheet 16 so that the respective lamination sheets 16 arranged as a straight line can be connected with each other. That is, the mounting band 20 is attached to the mounting groove 24 of the lamination sheet using a method such as welding, etc. to connect the lamination sheets 16 with each other.

Herein, it is desirable that the mounting band 20 is formed to be a structure in which a plurality of pieces are connected with each other, and fixed by welding or caulking operation in a state that the mounting band 20 is inserted into the mounting groove 24 of the lamination sheet 16.

Figure 6C:
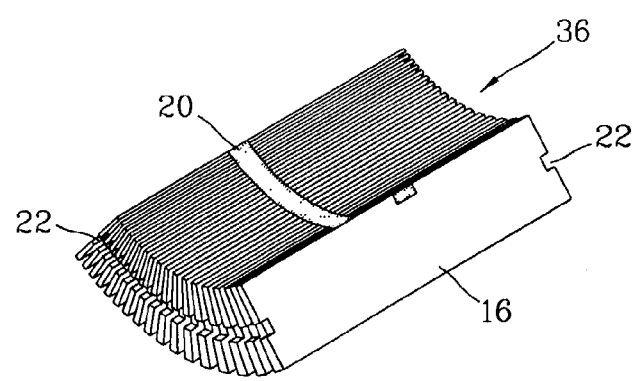

In addition, as shown in FIG. 6C, the step of curving the lamination sheets 16 laminated as a straight line to be a sector form is performed. That is, when side surfaces of the lamination sheets 16 making the outer circumferential surface are widened in a state that one surface of the lamination sheets constructing the inner circumferential surface are connected to each other by the mounting band 20, the lamination sheets 16 are curved as the sector form. At that time, the mounting band 20 is changed to a circular shape when the lamination sheets 16 are bent to be the cylinder since the plurality of pieces are connected in the mounting band 20.

Figure 6D:
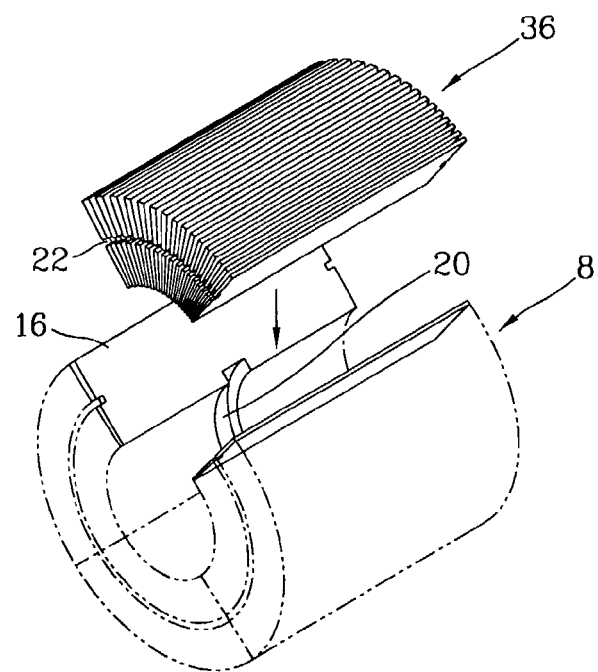
Figure 6E:
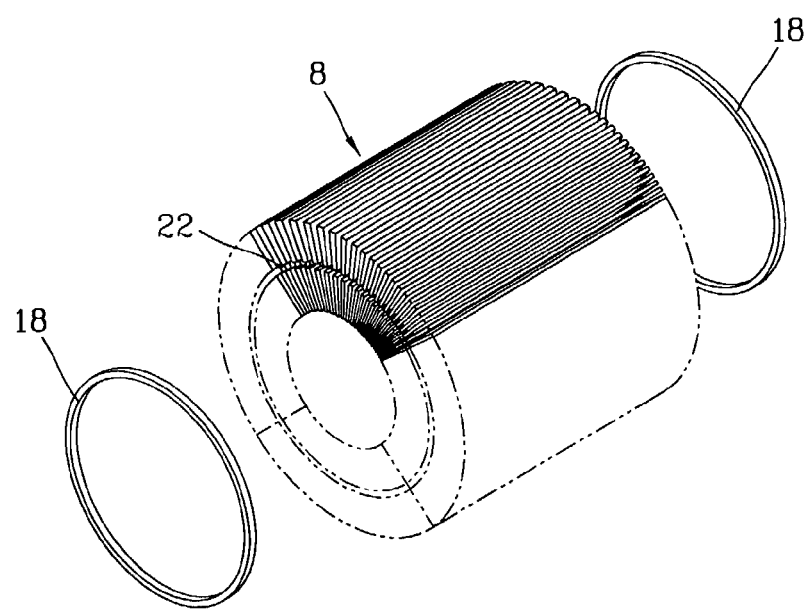

In addition, as shown in FIG. 6D, the above assemblies 36 of a sector shape are fabricated to be a cylinder shape. That is, if the assemblies 36 are assembled as 45° angle, the inner circumferential surfaces of the lamination sheets 16 located on peripheral sides of the four assemblies 36 are connected to make a cylindrical shape. In addition, as shown in FIG. 6E, when the lamination sheets 16 are formed as a cylinder, the supporting rings 18 are press-fitted into the grooves 22 formed on both side surfaces of the lamination sheets 16 for supporting the lamination sheets 16 to maintain the cylindrical shape.

Figure 7:
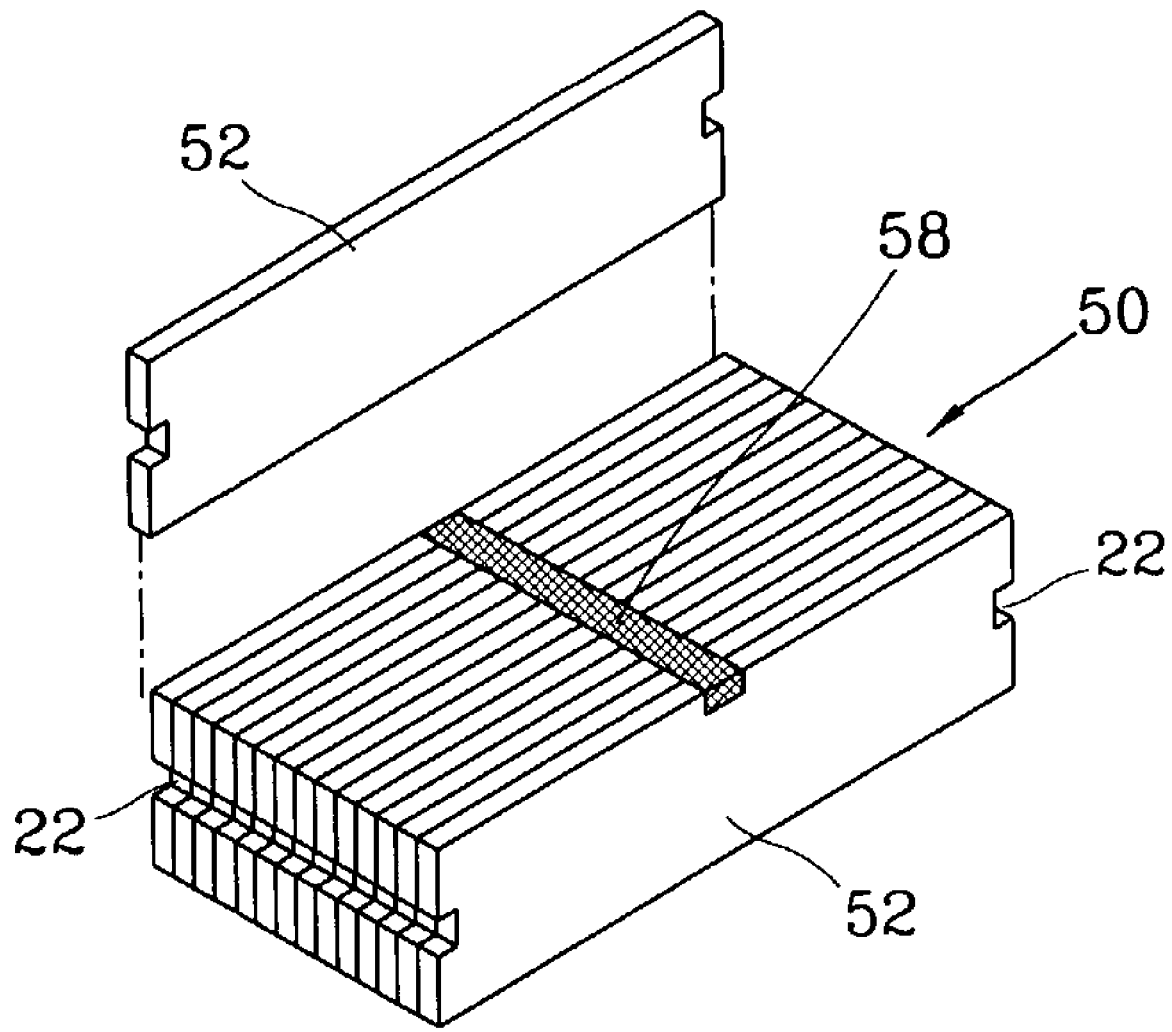
FIG. 7 is a partial perspective view showing an inner stator according to a second embodiment of the present invention.

FIG. 7 is a partial perspective view showing an inner stator according to a second embodiment of the present invention.

The inner stator 50 according to the second embodiment is formed as a thin rectangular plane plate having a predetermined length. In addition, the grooves 22 to which the supporting rings 18 are press-fitted are formed on both shorter sides of a lamination sheet 52 constructing both side surfaces of the inner stator 50, and the upper surfaces of the lamination sheets 52 are welded to be connected each other.

That is, a predetermined numbers of lamination sheets 52 are laminated, and after that, a welding band 58 is formed on the upper surfaces of the laminated lamination sheets 52 constructing the inner circumferential surface of the inner stator 50 to make the respective lamination sheets 52 be connected.

FIGS. 8A, 8B, 8C, and 8D are perspective views showing a manufacturing process for an inner stator of a reciprocating motor according to another embodiment of the present invention.

Figure 8A:
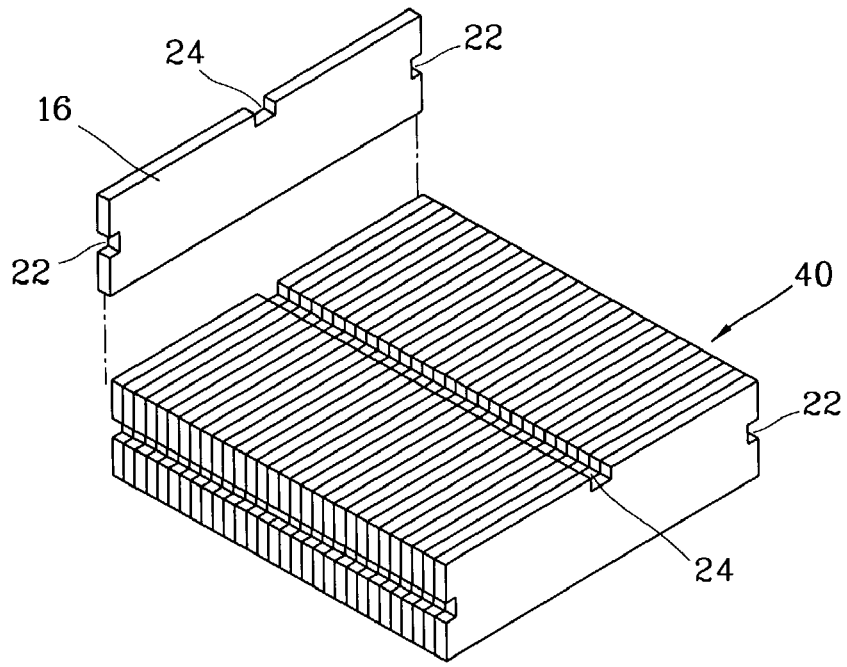
FIGS. 8A, 8B, 8C, and 8D are perspective views showing a manufacturing process for an inner stator for a reciprocating motor according to another embodiment of the present invention.

As shown in FIG. 8A, a plurality of lamination sheets 16 are laminated as a straight line. At that time, the lamination sheets 16 are laminated to form a unit 40 having the number by which a cylindrical shape can be made.

Figure 8B:
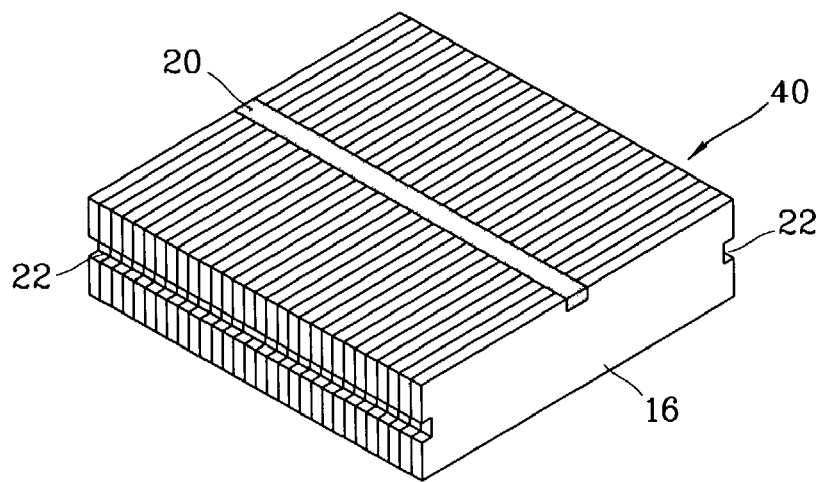
Figure 8C:
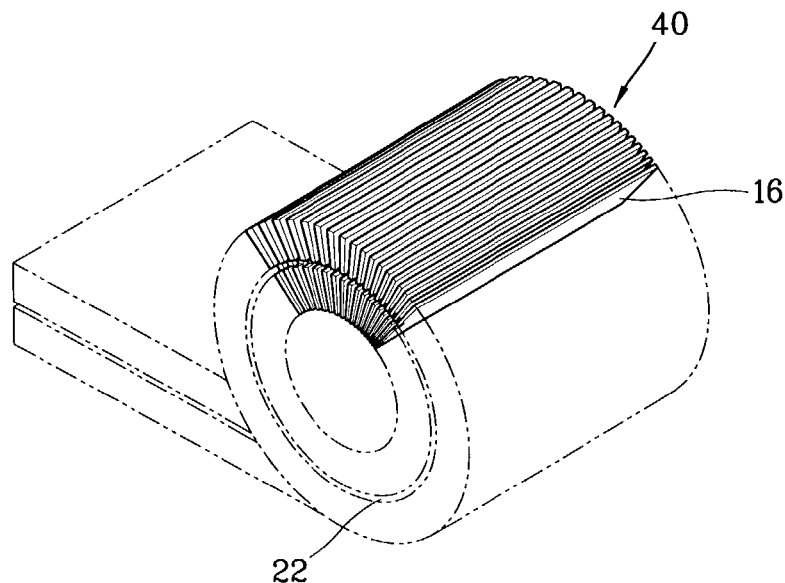

In addition, as shown in FIGS. 8B and 8C, the mounting band 20 is fixed on the mounting grooves 24 of the lamination sheets 16 to fix the part constructing an inner circumferential surface of the unit 40. After that, the unit 40 is curved to make a cylinder so that inner circumferential surfaces of both lamination sheets located on peripheral parts are contacted to each other.

Figure 8D:
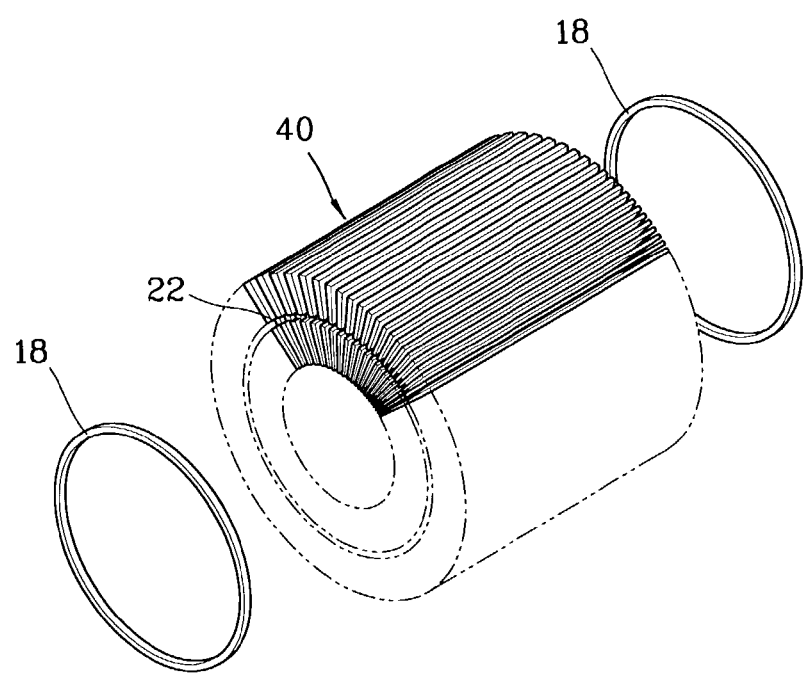

After that, as shown in FIG. 8D, the supporting rings 18 are press-fitted into the grooves 22 formed on both side surfaces of the lamination sheets 16 of cylindrical shape, and then the assembling processes are completed.

Effects of the stator for a reciprocating compressor and a manufacturing method according to the present invention will be described as follows.

Since the inner stator is made by laminating a plurality of lamination sheets as a straight line and bending it to be a cylindrical shape, the assembly can be made in a simple way and the assembling time can also be reduced.

Also, since the mounting ring is coupled to the inner circumferential surface of the inner stator to connect the lamination sheets, coupling intensity of the lamination sheets laminated in the radial direction can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A stator for a reciprocating motor comprising:
   a plurality of lamination sheets laminated into a unit;
   a mounting band fixed on an inner circumferential surface of the unit for the lamination sheets not to be separated from each other when the unit is bent to be a cylindrically-shaped body, wherein the mounting band is fixed in a mounting groove of the lamination sheets; and
   supporting rings disposed on a top side and a bottom side of the cylindrically-shaped body to support the unit and maintain a cylindrical shape.

2. The stator of claim 1, wherein each lamination sheet is formed as a thin rectangular planar plate, with grooves on both shorter sides of the rectangular planar plate, the supporting rings being disposed on the grooves, the mounting groove being on one longer side of the rectangular planar plate.

3. The stator of claim 2, wherein the mounting band is inserted into the mounting groove, and is formed as a predetermined shape bent from a straight shape to a curved shape.

4. The stator of claim 3, wherein the mounting band is divided into a plurality of pieces having predetermined lengths, and the pieces are connected to each other.

5. The stator of claim 1, wherein the mounting band is fixed in the mounting groove of the lamination sheets by welding.

6. The stator of claim 1, wherein the mounting band is fixed in the mounting groove of the lamination sheets by a caulking operation.

7. A stator for a reciprocating motor comprising:
   a plurality of lamination sheets laminated into a unit;
   a welding band formed on an inner circumferential surface of the unit for the lamination sheets not to be separated from each other when the unit is bent to be a cylindrically-shaped body, wherein the welding band is fixed in a mounting groove of the lamination sheets; and
   supporting rings disposed on a top side and a bottom side of the cylindrically-shaped body to supporting the unit and maintain a cylindrical shape.

8. A stator for a reciprocating motor comprising:
   a plurality of lamination sheets, the lamination sheets being laminated into a plurality of assemblies;
   a mounting band fixed on an inner circumferential surface of each of the assemblies not to be separated from each other when each of the assemblies is bent into an arc-shaped body, wherein the mounting band is fixed in a mounting groove of the lamination sheets; and
   supporting rings disposed on a top side and a bottom side of the arc-shaped body to support the circumferentially-arranged assemblies and maintain a cylindrical shape.

9. The stator of claim 8, wherein the mounting band is fixed in the mounting groove of the lamination sheets by welding.

10. The stator of claim 8, wherein the mounting band is fixed in the mounting groove of the lamination sheets by a caulking operation.

* * * * *